US012795739B2

(12) United States Patent
Guo et al.

(10) Patent No.: US 12,795,739 B2
(45) Date of Patent: Nov. 10, 2026

(54) METHODS FOR INITIATING RANDOM ACCESS PROCEDURE

(71) Applicant: ZTE Corporation, Shenzhen (CN)

(72) Inventors: Xiaolong Guo, Shenzhen (CN); Bo Gao, Shenzhen (CN); Shujuan Zhang, Shenzhen (CN); Yang Zhang, Shenzhen (CN); Ke Yao, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 309 days.

(21) Appl. No.: 18/619,102

(22) Filed: Mar. 27, 2024

(65) Prior Publication Data

US 2024/0244669 A1 Jul. 18, 2024

Related U.S. Application Data

(63) Continuation of application No. PCT/CN2022/112297, filed on Aug. 12, 2022.

(51) Int. Cl.
*H04W 74/0833* (2024.01)
*H04W 72/232* (2023.01)

(52) U.S. Cl.
CPC ..... *H04W 74/0833* (2013.01); *H04W 72/232* (2023.01)

(58) Field of Classification Search
None
See application file for complete search history.

(56) References Cited

U.S. PATENT DOCUMENTS

| | | | |
|---|---|---|---|
| 2015/0282213 | A1 | 10/2015 | Sun et al. |
| 2018/0317263 | A1 | 11/2018 | Ishi |
| 2020/0154377 | A1 | 5/2020 | Qian et al. |

(Continued)

FOREIGN PATENT DOCUMENTS

| | | | |
|---|---|---|---|
| CN | 111226487 | A | 6/2020 |
| CN | 114449674 | A | 5/2022 |

(Continued)

OTHER PUBLICATIONS

Extended European Search Report for European Patent Application No. 225954652.8, mailed on Dec. 19, 2024, 9 pages.

(Continued)

*Primary Examiner* — Walter J Divito
(74) *Attorney, Agent, or Firm* — Ashurst Perkins Coie US LLP

(57) ABSTRACT

This disclosure is related to wireless communication. A method of wireless communication, comprising receiving, by a wireless communication device, from a network device, a first message comprising random access configuration information associated with at least one transmission information; determining, by the wireless communication device, at least one random access resource pool associated with the at least one transmission information based on the first message; determining, by the wireless communication device, a random access preamble and a PRACH transmission occasion based on a random access resource pool associated with the transmission information; and transmitting, after the determining, the random access preamble to the network device in the PRACH transmission occasion.

20 Claims, 15 Drawing Sheets

(56) References Cited

U.S. PATENT DOCUMENTS

| | | | |
|---|---|---|---|
| 2020/0229242 A1 | 7/2020 | Xiong et al. | |
| 2020/0245200 A1 | 7/2020 | Xiong et al. | |
| 2020/0252969 A1 | 8/2020 | Chen | |
| 2021/0076271 A1 | 3/2021 | Jokela et al. | |
| 2021/0176798 A1 | 6/2021 | Zhou et al. | |
| 2021/0392650 A1 | 12/2021 | Abedini et al. | |
| 2022/0322453 A1 | 10/2022 | Sha et al. | |
| 2023/0284285 A1* | 9/2023 | Jang | H04W 52/0216 370/311 |

FOREIGN PATENT DOCUMENTS

| | | | |
|---|---|---|---|
| WO | 2022141559 | A1 | 7/2022 |
| WO | 2022165764 | A1 | 8/2022 |

OTHER PUBLICATIONS

Notice of Acceptance for South African Application No. 2025/00241, mailed on Feb. 3, 2026, 1 page.

International Search Report and Written Opinion for International Application No. PCT/CN2022/112297, mailed on Mar. 22, 2023, 6 pages.

Nokia, "Correction to TX resource pool sidelink mode 1 and 2 in 38.331 for V2X," Online, R2-2007198, Aug. 17-28, 2020, 441 pages.

* cited by examiner

METHODS FOR INITIATING RANDOM ACCESS PROCEDURE

This patent document is a continuation of and claims benefit of priority to International Patent Application No. PCT/CN2022/112297, filed on Aug. 12, 2022. The entire content of the before-mentioned patent application is incorporated by reference as part of the disclosure of this application.

TECHNICAL FIELD

This document generally relates to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support an increasingly mobile society.

SUMMARY

Various techniques are disclosed that can be implemented by embodiments in mobile communication technology, including 5th Generation (5G), new radio (NR), 4th Generation (4G), and long-term evolution (LTE) communication systems.

In one example aspect, a wireless communication method is disclosed. The method includes receiving, by a wireless communication device, from a network device, a first message comprising random access configuration information associated with at least one transmission information; determining, by the wireless communication device, at least one random access resource pool associated with the at least one transmission information based on the first message; determining, by the wireless communication device, a random access preamble based on a random access resource pool associated with the transmission information; and transmitting, after the determining, the random access preamble to the network device.

In another example aspect, another wireless communication method is disclosed. The method includes transmitting, from a network device to a wireless communication device, a first message comprising random access configuration information associated with at least one transmission information; receiving, by the network device, a random access preamble after the wireless communication device determines: at least one random access resource pool associated with the at least one transmission information based on the first message; and the random access preamble based on a random access resource pool associated with the transmission information.

In yet another exemplary aspect, the above-described methods are embodied in the form of a computer-readable medium that stores processor-executable code for implementing the method.

In yet another exemplary embodiment, a device that is configured or operable to perform the above-described methods is disclosed. The device comprises a processor configured to implement the method.

The above and other aspects and their implementations are described in greater detail in the drawings, the descriptions, and the claims.

DETAILED DESCRIPTION

Figure 1:
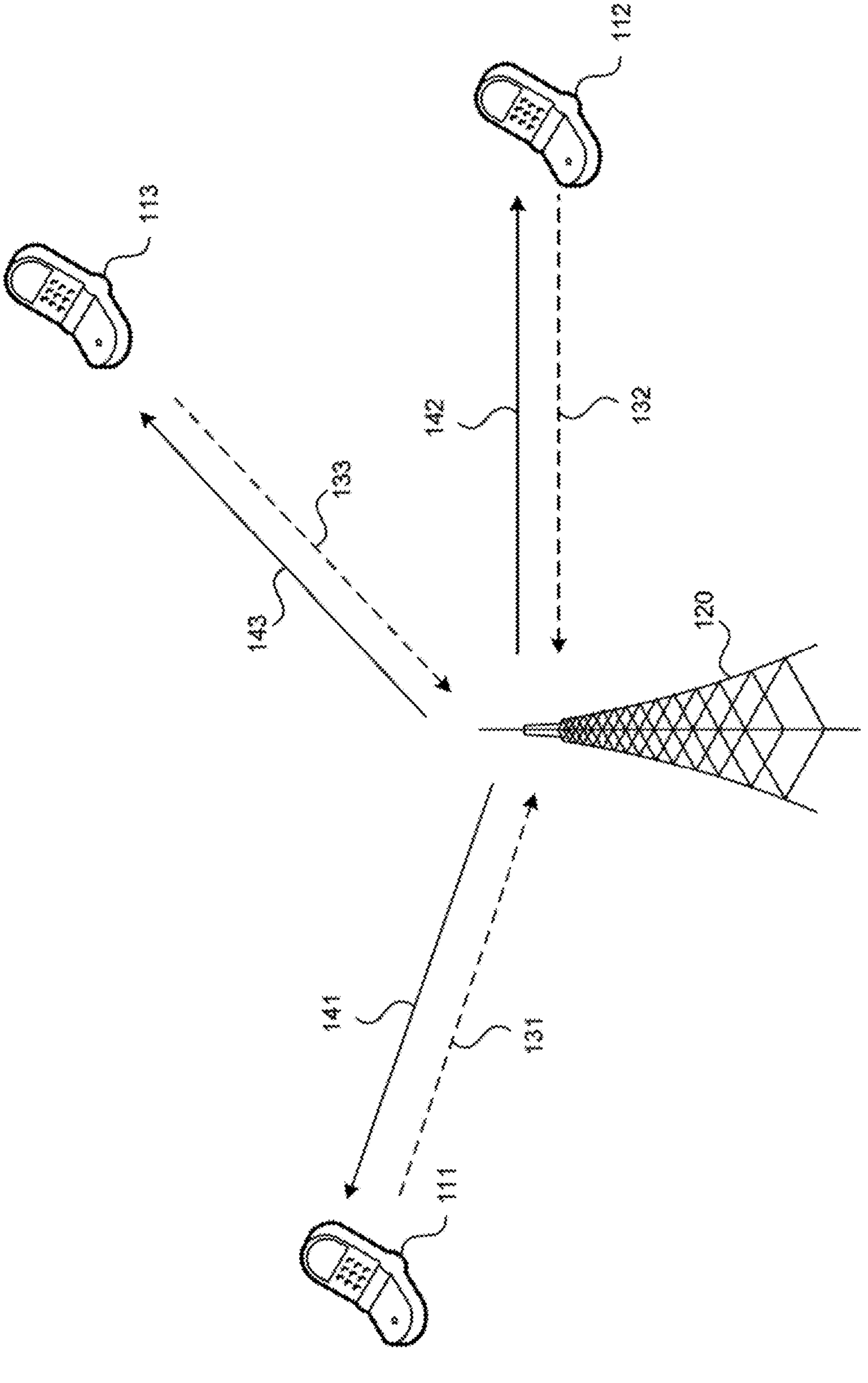
FIG. 1 shows an example of wireless communication including a base station (BS) and user equipment (UE) based on some implementations of the disclosed technology.

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Multiple Transmit-Receive Points (MTRP) transmission technology has been developed with great progress. Multiple TRPs can be realized by multiple base stations or multiple panels of one base station. Wireless communication device (UE) receives the first or initial timing advance command (TAC) in a Random Access Response (RAR) and receives the updated TAC in a MAC CE. The value of a TAC is determined by base station based on the measurement of uplink transmissions from UE. It is complicated for base station to send separate TACs associated with different TRPs in a RAR or TAC MAC CE. Especially for a RAR, UE can only receive initial TAC in the RAR corresponding to the transmitted random access preamble, hence random access configuration and preamble transmission determination should be considered when MTRP transmission is configured.

UE can be configured by MTRP transmission after UE is in the RRC_CONNECTED state, and initial access to a second TRP may be not needed, however some other Random Access triggering events could occur for the second TRP, e.g., uplink (UL) data arrival during RRC_CONNECTED when UL synchronization status is in "non-synchronised". UE requires respective preamble, physical random access channel (PRACH) occasions, or mapping of Synchronization Signal/Physical Broadcast Channel (SS/PBCH) block to PRACH occasion for different TRPs to differentiate TRP-specific random access procedures.

In mobility management, in order to reduce latency, uplink alignment establishment for the target cell can be operated together with uplink alignment maintenance for the source cell. UE can receive random access configuration information associated with the target cell and determines the preamble transmission to initiate the random access procedure for the target cell.

A series of approaches to perform random access procedures are considered in the following aspects:

To determine PRACH transmission occasions for multiple TRPs or serving cells, UE receives separate Random Access Channel (RACH) configuration for different TRPs or serving cells and determines the RACH occasions respectively. The RACH occasions for different TRPs/serving cells are determined based on the configuration, such that it can be non overlapped, partially overlapped and fully overlapped.

To determine mapping of SSB to PRACH occasion for multiple TRPs, UE receives one or more groups of SS/PBCH (Physical Broadcast Channel) blocks in a time duration and determines PRACH occasions associated with the corresponding transmission information based on the received random access configuration information. UE determines the mapping of SSB to PRACH occasion associated with a transmission information based on a message.

To determine a preamble transmission, UE generates a plurality of preambles for each PRACH occasion based on the random access configuration information. UE is provided with a number of contentions based preambles per SSB index per valid PRACH occasion associated with a transmission information based on random access configuration information associated with the corresponding transmission information.

To initiate random access procedure based on more than one random access resource pools, each random access resource pool comprises at least one of a plurality of preambles, a set of PRACH occasions, or a group of SSB indexes. For different events triggering random access procedure initiation, UE determines the preamble transmission based on one of the multiple random access resource pools and the determination is based on a default rule, a message from base station, or the measurement.

Downlink and uplink synchronization are necessary steps for ensuring reliable wireless communication in LTE and NR wireless system. The downlink synchronization is realized by receiving primary synchronization signal (PSS) and secondary synchronization signal (SSS), and the uplink synchronization is realized by random access procedure and uplink timing alignment maintenance.

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

Figure 2:
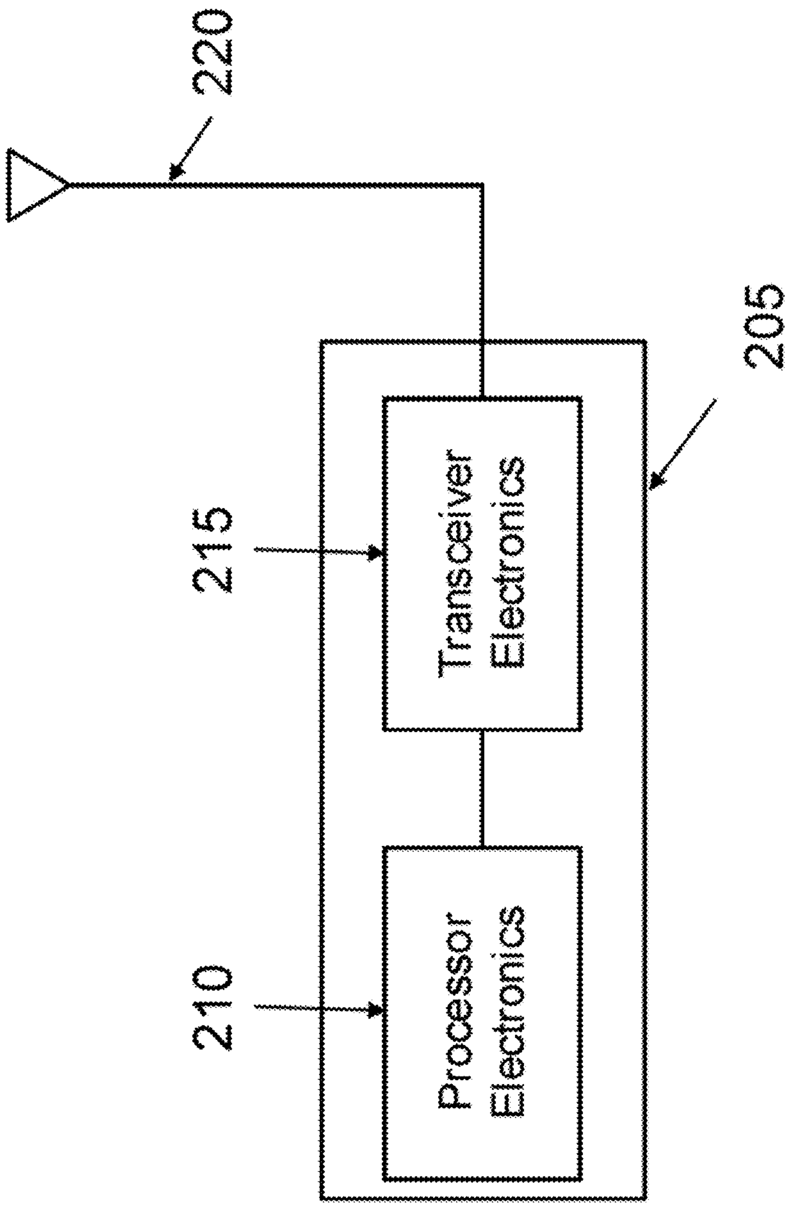
FIG. 2 shows an example of a block diagram of a portion of an apparatus based on some implementations of the disclosed technology.

FIG. 2 is a block diagram representation of a portion of an apparatus, in accordance with some embodiments of the presently disclosed technology. An apparatus 205 such as a network device or a base station or a wireless device (or UE), can include processor electronics 210 such as a microprocessor that implements one or more of the techniques presented in this document. The apparatus 205 can include transceiver electronics 215 to send and/or receive wireless signals over one or more communication interfaces such as antenna(s) 220. The apparatus 205 can include other communication interfaces for transmitting and receiving data. Apparatus 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the apparatus 205.

Figure 3:
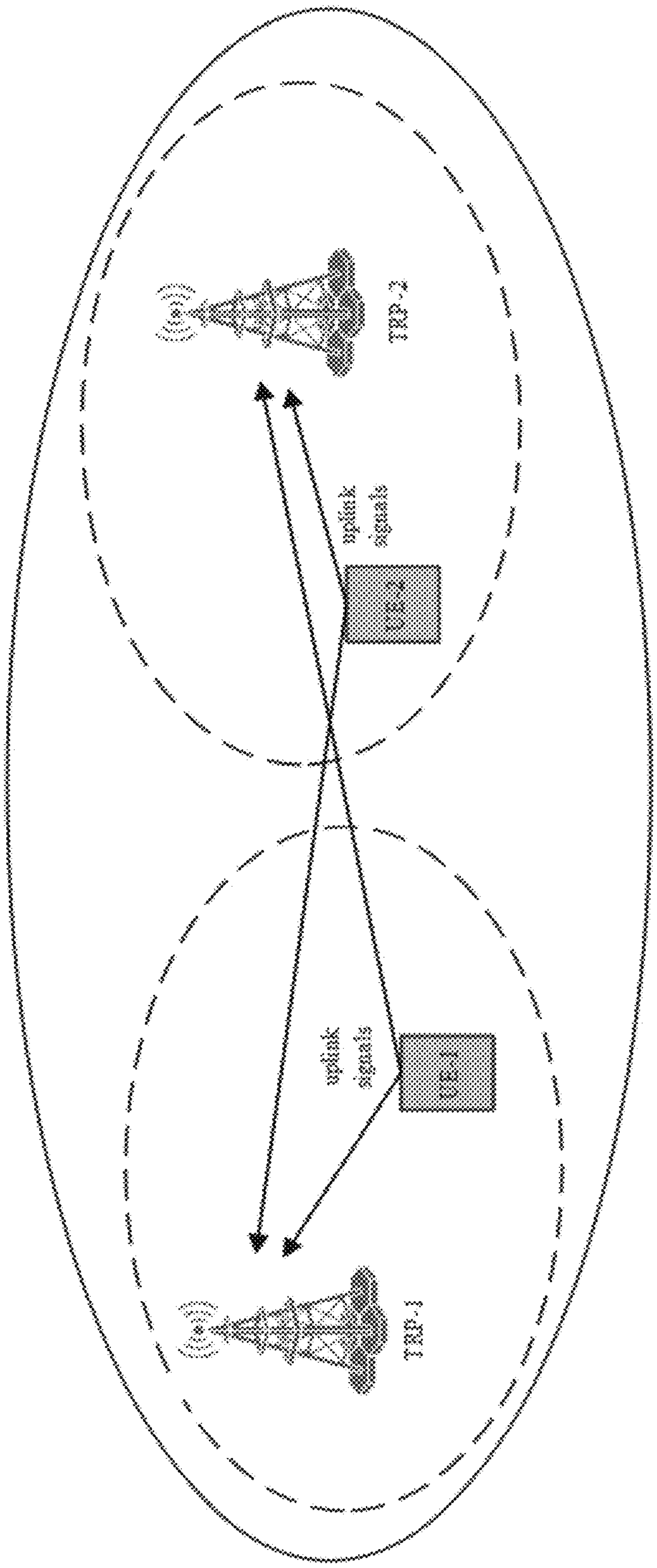
FIG. 3 shows an example diagram of inter-cell based MTRP uplink transmissions from multiple UEs.

FIG. 3 shows an example diagram of inter-cell based MTRP uplink transmissions from multiple UEs. As shown in FIG. 3, different geographical locations of base stations or different physical directions of panels might result in different transmission delay for all uplink and downlink signals. Uplink synchronization is to ensure arrival time of uplink transmissions from diverse UEs can be in the range of cyclic preamble of the downlink frame/sub-frame/slot/sub-slot, which can be regarded that uplink transmissions from multiple UEs within the same frame are approximately aligned with each other.

UE cannot transmit uplink signals except PRACH until the uplink alignment has been established, meaning, until the RAR corresponding to the preamble transmitted by the UE has been received. The events triggering initiation of random access procedure are specified in NR TS 38.321, and be based on RRC layer, MAC sub-layer, and physical layer. Prior to the initiation of the random access procedure, UE receives a plurality of messages including configuration of RACH, a specific preamble index or a plurality of candidate preambles, a set of SS/PBCH block indexes, etc. UE determines to transmit a preamble in a PRACH occasion for the first step of random access procedure, wherein the preamble is determined based on an indication from PDCCH order or Reference Signal Received Power (RSRP) measurements of SSB indexes, and the PRACH occasion is determined by an indication from PDCCH order or the configuration of PRACH.

The random access procedures can be classified into contention based random access (CBRA) and contention based free random access (CFRA) on whether the transmitted preamble is UE-specific or not. When no sufficient UE-specific preambles are configured to be used for BFR, handover, request for other System Information (SI), etc., UE requires to initiate CBRA procedures rather than CFRA procedures.

Figure 4:
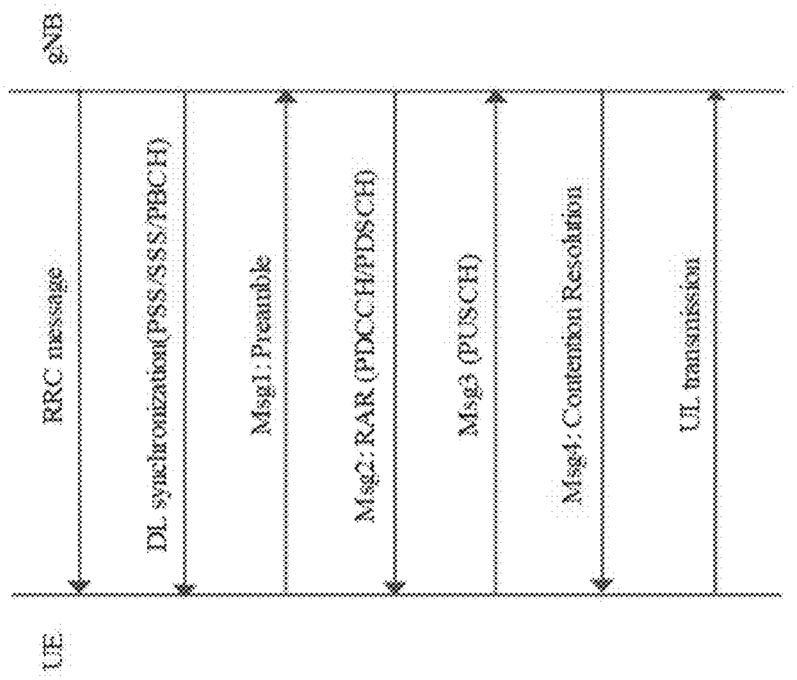
FIG. 4 shows an example of a typical contention based Random Access procedure.

FIG. 4 shows a typical contention based Random Access procedure. As shown in FIG. 4, a typical procedure of contention based random access is illustrated. UE first receives messages including RRCReconfiguration, CellGroupConfig, RACHConfiguration, etc. and completes the downlink synchronization through receiving PSS, SSS and PBCH. A UE in NR system assumes that reception occasions of a physical broadcast channel (PBCH), PSS, and SSS are in consecutive symbols and form a SS/PBCH block (SSB). Based on the configuration messages and the measurement of SS/PBCH blocks, UE determines to transmit a preamble in a PRACH occasion to the network. The bast station then transmits a Random Access Response (RAR) including a timing advance command (TAC) and the scheduling of Msg3. When UE receives the Msg4 which includes the specific contention resolution information for the UE, the CBRA procedure completes successfully, and uplink synchronization is established.

The configuration of RACH comprises at least one of an index of PRACH configuration, a number of preambles, the number of SSB in a PRACH occasion, the number of preambles for a SSB, or the number of frequency division multiplexed PRACH occasion. The PRACH configuration is predefined in a table in TS 38.211, comprising the format of a preamble, the frame or subframe number of a PRACH occasion, the start symbol of a PRACH occasion, and the duration of a PRACH occasion.

The TAC included in the RAR can be regarded as the first or initial timing advance command, as preambles are transmitted basically in the case that out of synchronization for Uplink, RRC reconfiguration, beam failure recovery, initial access to the network, etc. UE adjusts transmission timing of uplink transmission based on the TAC in RAR and further adjusts the transmission timing after receiving a new TAC. In most cases, the TAC indicates the adjustment amount from the old transmission timing advance to the new transmission timing advance.

In the current NR system, the UE can be configured up to 64 preambles in a serving cell, and the preambles are configured to be used for CBRA or CFRA. For preambles for CBRA, base station configures to UE the mapping of SSB to PRACH occasion, and UE transmits a preamble in a PRACH occasion associated with a SSB of which the RSRP measurement is beyond the threshold. Base station can know the best beam direction of the UE based on the RO in which the preamble is transmitted.

Notes that, in this document, 'transmission information' comprises at least one of transmit-receive point (TRP), base station, a set of panels of one base station or a physical cell. Furthermore, the transmission information comprises at least one of "information grouping one or more reference signals", "reference signal resource set", "PUCCH resource set", "panel related information", "sub-array", "antenna group", "antenna port group", "group of antenna ports", "beam group", "physical cell index (PCI)", "TRP related information", "CORESET pool index", candidate cell, candidate cell group, TAG, "UE capability value" or "UE capability set".

Notes that, in this document, "TRP-Id" comprises at least one of CORESET index, CORESET pool index, SS/PBCH index, transmission configuration indicator (TCI) state index, PCI, RS set index, SRS resource set index, spatial relation index, power control parameter set index, panel index, beam group index, sub-array index, the index of CDM group of DMRS ports, the group index of CSI-RS resources, CMR set index, TAG index, candidate cell index, or candidate cell lists.

The "uplink signal" in this document can be PUCCH, PUSCH, SRS or PRACH, "slot" in this document can be equivalent to sub-slot, frame, sub-frame, and Time Alignment Group (TAG) in this document includes one or more serving cells, or one or more serving cells associated with at least one transmission information.

Note that, PRACH occasion comprises an area specified in time and frequency domain that are available for the transmission of random access preamble.

Note that, PRACH configuration comprises at least one of the formats of a preamble, the frame or subframe number of a PRACH occasion, the start symbol of a PRACH occasion, the duration of a PRACH occasion, the number of time-domain PRACH occasions within a PRACH slot or the number of PRACH slots in a subframe.

A series of approaches to perform random access procedures are considered in the following aspects.

Solution 1: For determining respective RACH occasions for respective transmission information:

UE receives a message comprising at least one set of random access configuration information associated with respective transmission information.

The set comprises at least one of an index of PRACH configuration, a number of preambles, the number of SSB in a RACH occasion, the number of preambles associated with a SSB, or the number of frequency division multiplexed RACH occasion.

The PRACH configuration comprises at least one of the format of a preamble, the frame or subframe number of a RACH occasion, the start symbol of a RACH occasion, or the time duration of a RACH occasion, or PRACH configuration period.

UE determines respective set of RACH occasions based on the respective set of random access configuration information.

More details can be found in embodiment 1.

Solution 2: For determining mapping of SSB to PRACH occasion:

UE further receives a message comprising at least one group of SS/PBCH blocks (SSB) in a time duration.

The SSB in the time duration are indexed in an ascending order in time.

UE receives a message configuring or indicating UE to associate a transmission information and a SSB (index).

The message comprises at least one of a flag, an index of the SSB, a number of SSBs, a bit map, a sequence of indices of SSBs, a period of the number of SSBs, or a value within the period, time or frequency domain position related information of the SSB.

UE determines the mapping of SSB to PRACH occasion for respective transmission information based on the association and the determined set of RACH occasions.

More details can be found in embodiment 2.

Solution 3: For determining the association of a preamble index to a SSB index in a PRACH occasion:

UE determines random access preambles associated with a SSB index and a transmission information based on the configured preamble resources and random access configuration information. UE can be configured separate or common preamble resources for different transmission information.

UE generates a plurality of preambles for each PRACH occasion based on the random access configuration information.

UE generates respective set of preambles associated with the respective transmission information based on the random access configuration information associated with the corresponding transmission information.

UE generates a set of preambles to be used for any of the transmission information based on the random access configuration associated with at least one of the transmission information.

UE determines a number of contentions based preambles per SSB index per valid PRACH occasion associated with a transmission information based on random access configuration information associated with the corresponding transmission information and the generated preambles.

More details can be found in embodiment 3.

Solution 4: For determining random access preamble transmission to initiate random access procedure triggered by a specific event:

UE determines the preamble transmission associated with a transmission information based on a random access resource pool associated with the corresponding transmission information.

UE determines the preamble transmission associated with a transmission information based on one of the random access resource pools. The determination is based on default rule, a message from base station or the measurement.

More details can be found in embodiment 4.

Figure 5:
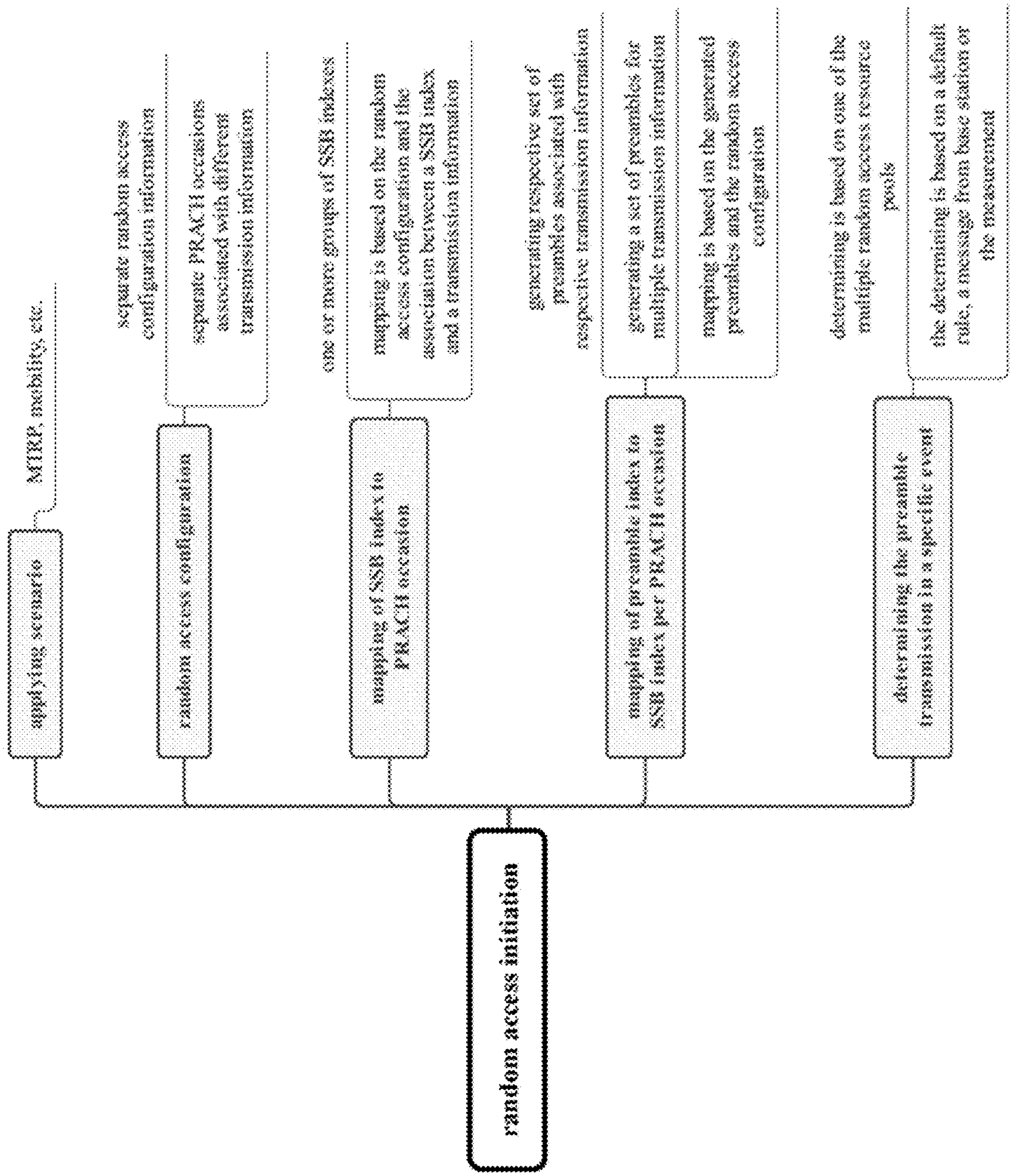
FIG. 5 shows an example of a diagram for the framework for random access procedure initiation.

FIG. 5 illustrations a diagram for the framework for random access procedure initiation.

Embodiment 1

Embodiment 1 is to determine respective RACH occasions for respective transmission information. UE can be configured or indicated one or more random access configuration information and determines one or more sets of PRACH occasions associated with respective transmission information.

In some embodiments, UE receives multiple Beam Failure Recovery Configuration associated with respective transmission information from base station. Each of the Beam Failure Recovery Configuration indicates a dedicated PRACH resource configuration for BFR, wherein the PRACH resource configuration comprises at least one of an index of a reference signal or synchronization signal and an index of a preamble.

In some embodiments, UE receives a Beam Failure Recovery Configuration from base station. The Beam Failure Recovery Configuration indicates multiple dedicated PRACH resource configuration for BFR, and each of the dedicated PRACH resource configuration is associated with a transmission information.

In some embodiments, UE receives multiple System Information Request Configuration associated with respective transmission information from base station. Each of the System Information Request Configuration comprises at least one of a start index of preambles, configuration of RACH occasions or the periodicity of the System Information Request Configuration.

In some embodiments, UE receives a System Information Request Configuration from base station. The System Information Request Configuration indicates multiple PRACH resources for SI Request, wherein each PRACH resource comprises at least one of a start index of preambles, configuration of RACH occasions or the periodicity of the System Information Request Configuration. Each of the PRACH resources for SI Request is associated with a transmission information.

In some embodiments, UE receives multiple Dedicated Random Access Configuration associated with respective transmission information from base station. Each of the Dedicated Random Access Configuration indicate a plurality of dedicated random access parameters comprising at least one of a CFRA configuration or a CFRA configuration for two-step RA procedure, wherein the CFRA configuration includes at least one of: configuration of PRACH occasions, a list of PRACH-resource configuration or the number of SSB indexes per PRACH occasion.

In some embodiments, UE receives a Dedicated Random Access Configuration from base station. The Dedicated Random Access Configuration indicates multiple dedicated random access parameters associated with a respective transmission information. The dedicated random access parameters comprising at least one of a CFRA configuration or a CFRA configuration for two-step RA procedure. The CFRA configuration comprises at least one of the number of SSB per RACH occasion, a list of synchronization signal, a list of reference signal, a range of RSRP threshold or a total number of preambles.

In some embodiments, UE receives a message indicating one or more random access configuration information elements, and random access configuration information included in each information element comprises at least one of the total number of random access preambles, the number of SSB per PRACH occasion, the number of preambles for CBRA associated with a SSB, the number of preambles for a specific group, the value range used in RSRP measurements and thresholds, the subcarrier spacing, an index of root sequence for determining preambles, an index of the PRACH configuration, the number of PRACH transmission occasions FDMed in one time instance, or the indication to determine the frequency position of a PRACH occasion. The random access configuration information element and random access configuration information are associated with a transmission information.

In some embodiments, all, partial or none PRACH configuration parameters are commonly configured for different transmission information. UE obtains the association between a PRACH configuration parameter for a specific transmission information and the corresponding transmission information based on the message from base station or a predefined rule. In an example, UE receives a message indicating two CFRA configuration named CFRA-A and CFRA-B, CFRA-A is associated with a first transmission information and CFRA-B is associated with a second transmission information.

In some embodiments, UE determines respective PRACH occasions for the respective transmission information based on the received one or more random access configuration information. The PRACH occasions associated with different transmission information can be non-overlapped, partial-overlapped and fully overlapped. The PRACH occasions associated with different transmission information are indexed respectively according to the time and frequency position of the PRACH occasions.

FIGS. 6 to 9 illustrate some examples of UE's determination of non-overlapped, partial overlapped and fully overlapped of PRACH occasions associated with different transmission information. UE determines two sets of PRACH occasions associated with respective transmission information and indexes them respectively.

Figure 6:
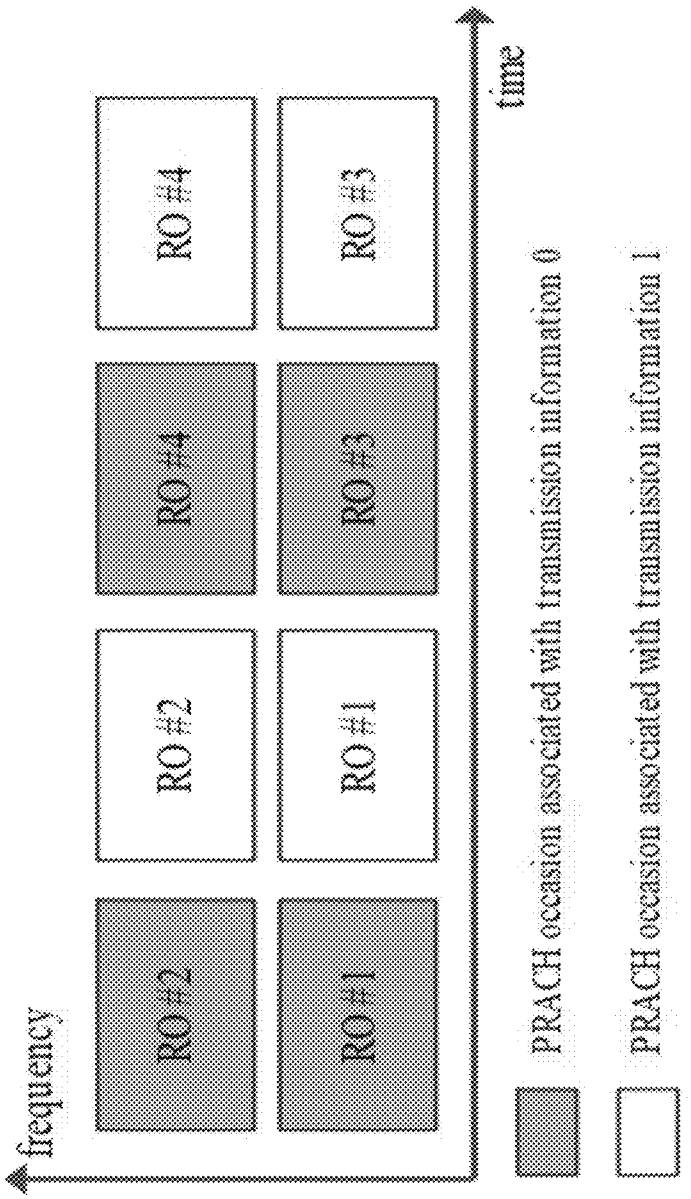
FIG. 6 shows an example of time domain non-overlapped PRACH occasions associated with different transmission information.

FIG. 6 illustrates time domain non-overlapped PRACH occasions associated with different transmission information.

Figure 7:
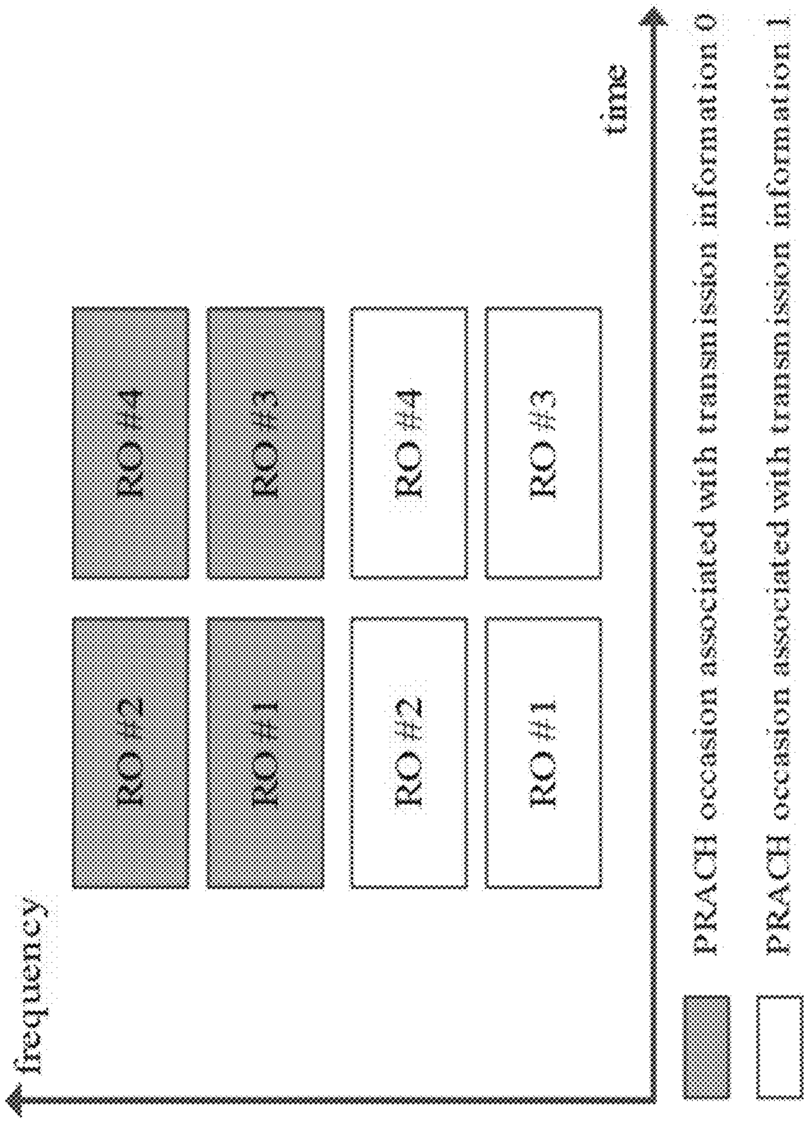
FIG. 7 shows an example of frequency domain non-overlapped PRACH occasions associated with different transmission information.

FIG. 7 illustrates frequency domain non-overlapped PRACH occasions associated with different transmission information.

Figure 8:
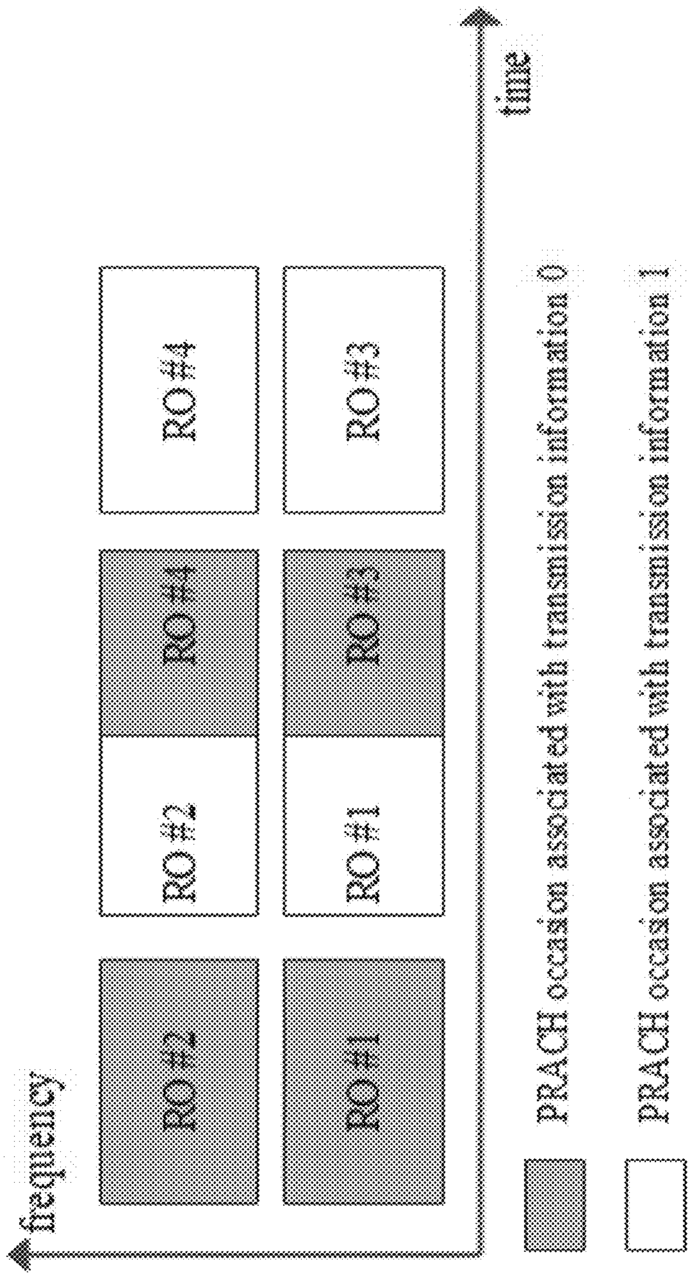
FIG. 8 shows an example of partial overlapped PRACH occasions associated with different transmission information.

FIG. 8 illustrates partial overlapped PRACH occasions associated with different transmission information.

Figure 9:
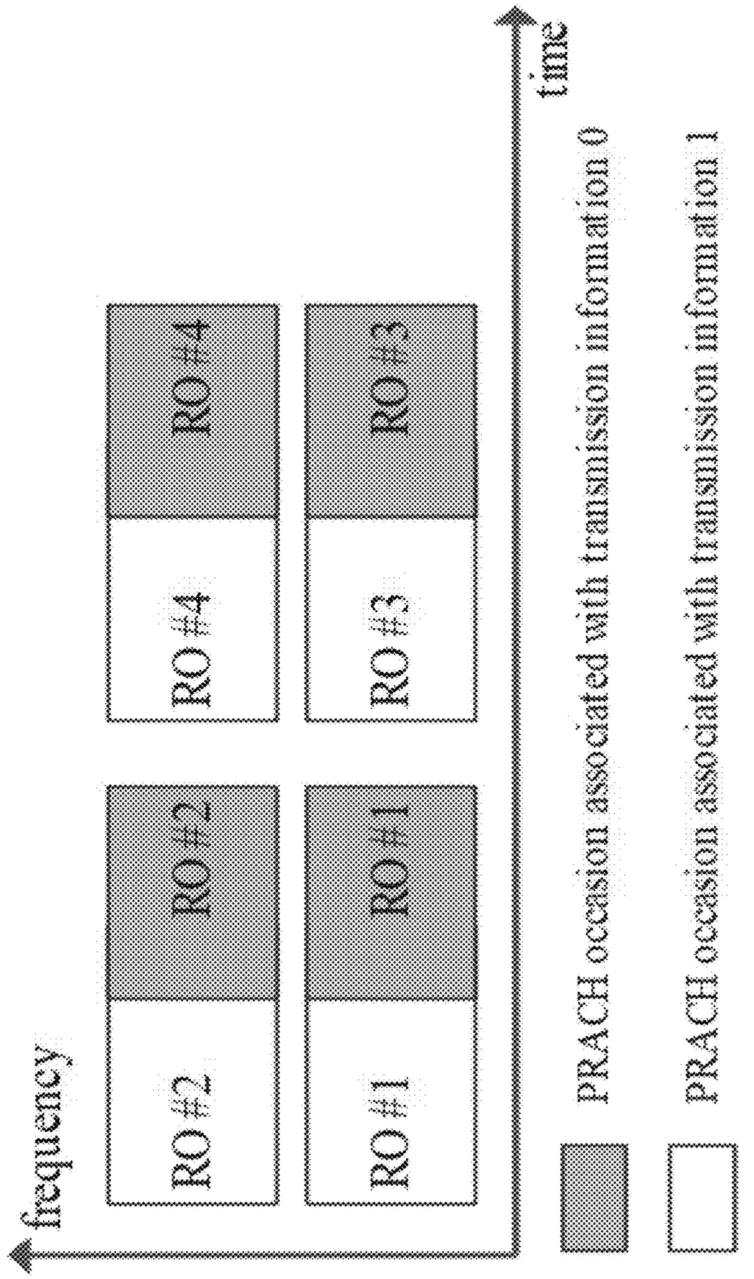
FIG. 9 shows an example of fully overlapped PRACH occasions associated with different transmission information.

FIG. 9 illustrates fully overlapped PRACH occasions associated with different transmission information.

Embodiment 2

Embodiment 2 is to determine mapping of a SS/PBCH block to a PRACH occasion associated with a transmission information. UE receives one or more groups of SS/PBCH blocks in a time duration and determines PRACH occasions associated with the corresponding transmission information based on the received random access configuration information.

In some embodiments, UE receives a group of SS/PBCH blocks in a time duration (e.g., a half frame) and indexes them according to the time position of the SS/PBCH block.

In some embodiments, UE receives more than one groups of SS/PBCH blocks in a time duration, wherein each group of SS/PBCH blocks is associated with a transmission information. UE indexes the SS/PBCH blocks per group or across groups according to the time position of the SS/PBCH block.

In some embodiments, UE receives a message indicating the association between a SSB index and a transmission information.

UE receives a message that indicates a flag. In an example, a value of the flag indicates UE that all the odd SSB indexes are associated with a first transmission information and all the even SSB indexes are associated with a second transmission information. Another value of the flag indicates that all the odd SSB indexes are associated with a second transmission information and all the even SSB indexes are associated with a first transmission information. In an example, a value of the flag indicates UE that the first half of SSB indexes are associated with a first transmission information and the second half of SSB indexes are associated with a second transmission information.

UE receives a message that indicates a start index and a number of the SS/PBCH blocks. The SSB indexes associated with the message are associated with a first transmission information and the other SSB indexes are associated with a second transmission information. In an example, the message indicates the start index to be i and the number of SS/PBCH blocks is m, SSBs with indexes from i to $i+m-1$ are associated with a first transmission information and the other SSBs are associated with a second transmission information.

UE receives a message that indicates a period number and one or more values which are not greater than the period number. The association between a SSB index and a transmission information is periodically determined based on the message. In an example, the total number of SSBs is N, and the message indicates the period number to be P and the values to be a and b, SSBs with indexes $(a,b)+i*P$ are associated with a first transmission information, wherein $i=0, 1, \ldots, \text{floor}(N/P)-1$, and other SSBs are associated with a second transmission information.

UE receives a message that indicates a bitmap. The size of the bitmap is no less than the total number of SSBs which are indexed together. The first bit is associated with SSB index 0, and the second bit is associated with SSB index1, and so on. The bit value 0 represents that the corresponding SSB is associated with a first transmission information and the bit value 1 represents that the corresponding SSB is associated with a second transmission information.

UE receives a message that indicates a sequence of indexes of SSBs. The SSBs associated with the sequence are associated with a first transmission information and the other SSBs are associated with a second transmission information.

In some embodiments, the UE is provided a number of N of SS/PBCH block indexes associated with a first transmission information per valid PRACH occasion associated with the first transmission information and a number of M of SS/PBCH block indexes associated with a second transmission information per valid PRACH occasion associated with the second transmission information.

In some embodiments, one SS/PBCH block index associated with a transmission information is mapped to N consecutive valid PRACH occasions associated with the corresponding transmission information, wherein N is determined based on random access configuration information associated with the transmission information.

In some embodiments, UE determines an association period per transmission information based on the random access configuration information associated with the corresponding transmission information. The mapping of SS/PBCH block indexes to PRACH occasions associated with a transmission information is periodic within the corresponding association period and the cycle of the mapping is at least 1.

Figure 10:
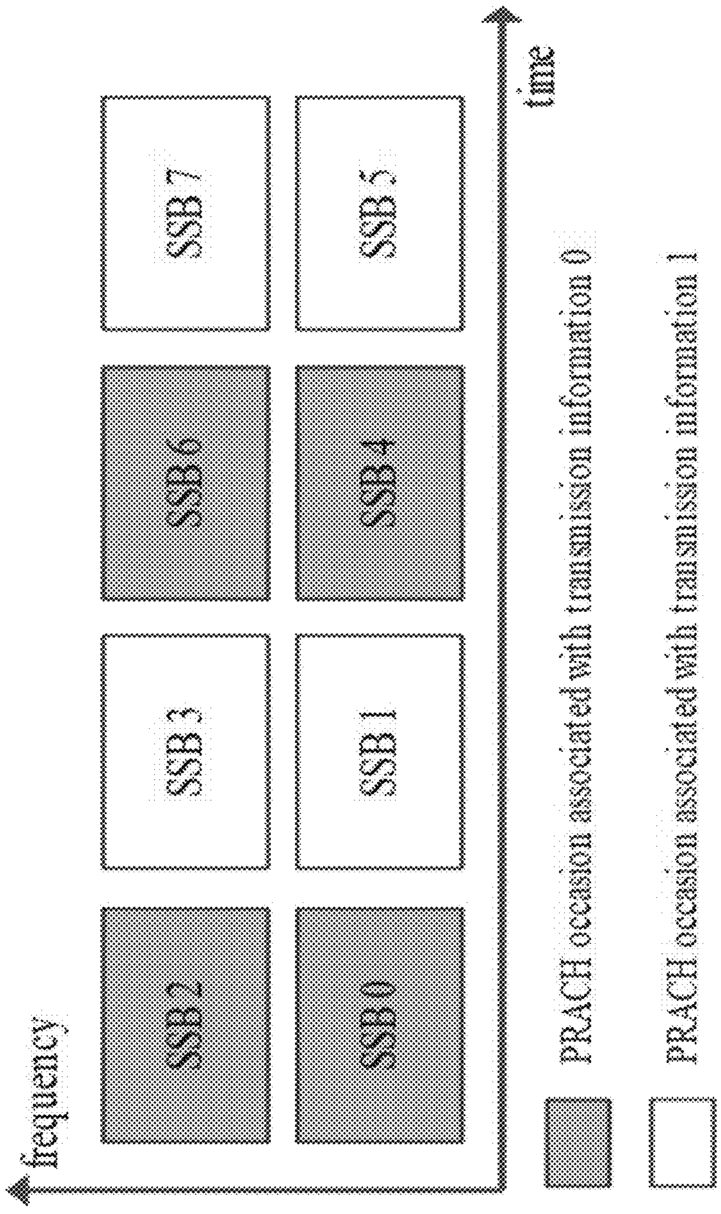
FIG. 10 shows an example of mapping of SSB indexes to PRACH occasions associated with transmission information.

FIG. 10 illustrates an example of mapping of SSB indexes to PRACH occasions associated with transmission information. As shown in FIG. 10, even SSB indexes are associated with transmission information 0 and odd SSB indexes are associated with transmission information 1, random access configuration information indicates 1 SSB per valid PRACH occasion for both transmission information.

Figure 11:
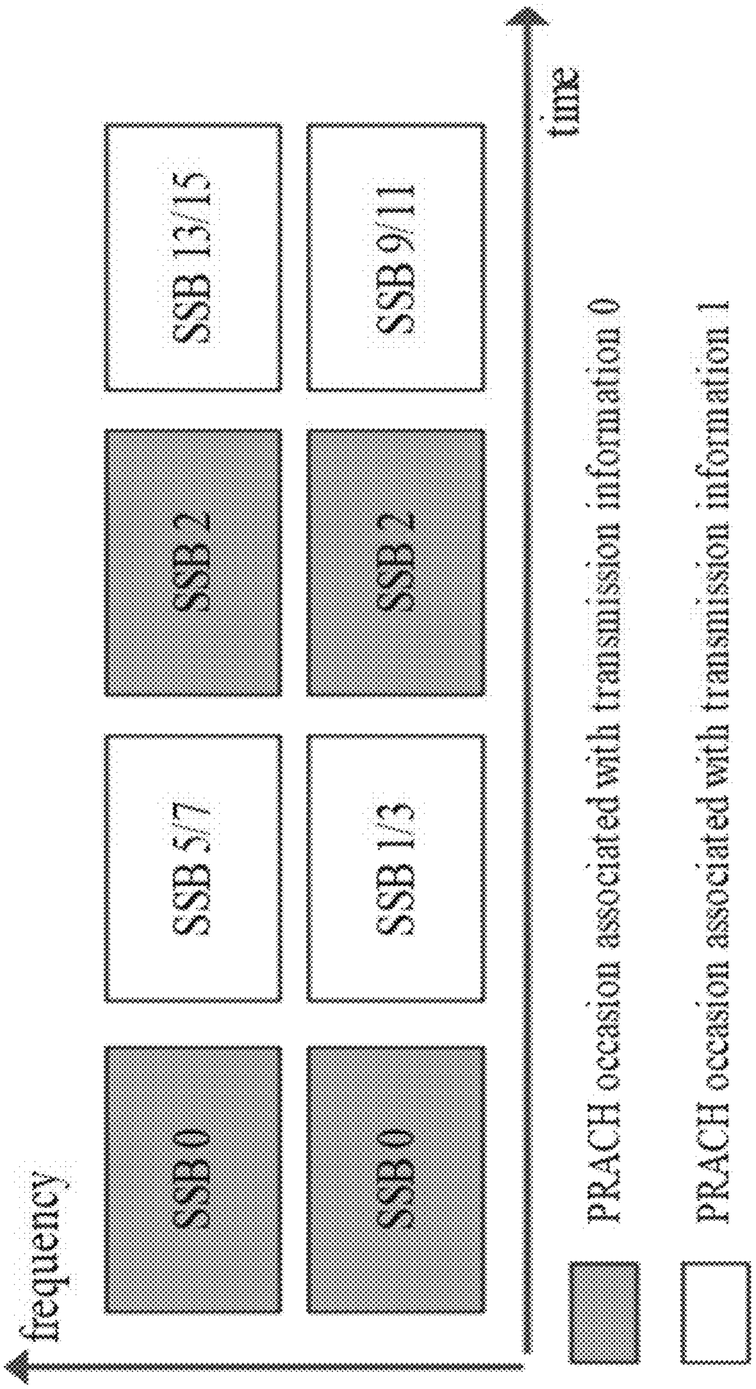
FIG. 11 shows an example of mapping of SSB indexes to PRACH occasions associated with transmission information.

FIG. 11 illustrates an example of mapping of SSB indexes to PRACH occasions associated with transmission information. As shown in FIG. 11, even SSB indexes are associated with transmission information 0 and odd SSB indexes are associated with transmission information 1, random access configuration information indicates that one SS/PBCH block is mapped to 2 consecutive valid PRACH occasions associated with transmission information 0 and 2 SS/PBCH blocks are mapped to one valid PRACH occasion associated with transmission information 1.

Figure 12:
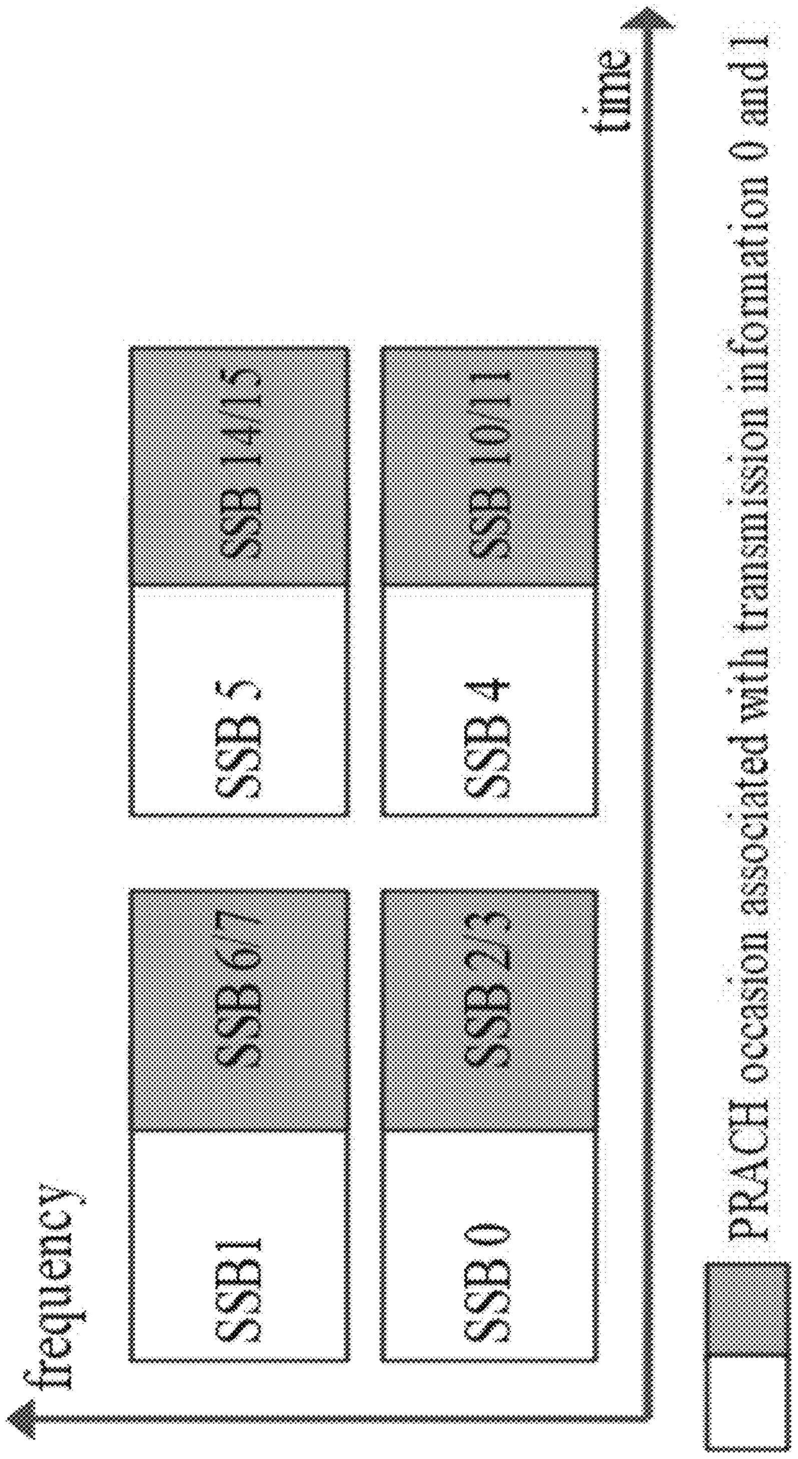
FIG. 12 shows an example of mapping of SSB indexes to PRACH occasions associated with transmission information.

FIG. 12 illustrates an example of mapping of SSB indexes to PRACH occasions associated with transmission information. As shown in FIG. 12, the association between a SSB index and a transmission information is determined based on a message including a period (i.e. 4) and one or more values (i.e. 0 and 1), random access configuration information indicates that one SS/PBCH block is mapped to one valid PRACH occasions associated with transmission information 0 and two SS/PBCH blocks are mapped to one valid PRACH occasion associated with transmission information 1.

In all the examples above, only a part of the mapping of SSB indexes to PRACH occasions is shown in the figures and it is assumed that SS/PBCH blocks associated with different transmission information are indexed jointly.

Embodiment 3

Embodiment 3 is to determine association of random access preambles to a SSB index in a PRACH occasion based on the configured preamble resources and random access configuration information. UE can be configured separate or common preamble resources for different transmission information.

In some embodiments, UE generates a plurality of preambles for each PRACH occasion based on the random access configuration information.

UE generates respective set of preambles associated with the respective transmission information based on the random access configuration information associated with the corresponding transmission information. In an example, UE is configured to generate M preambles for each PRACH occasion associated with a first transmission information based on a first logical root sequence index indicated in random access configuration information associated with the first transmission information and generate N preambles for each PRACH occasion associated with a second transmission information based on a second logical root sequence index indicated in random access configuration information associated with the second transmission information.

UE generates a set of preambles for any of the transmission information based on the random access configuration associated with at least one of the transmission information. In an example, the number of preambles and the logical root sequence index are configured the same in random access configuration information associated with transmission information. In an example, UE determines to use one of candidate values of the number of preambles and the logical root sequence index which are configured separately in random access configuration information associated with transmission information.

In some embodiments, UE is provided with a number of contention based preambles per SSB index per valid PRACH occasion and the number of SSB indexes mapped to one valid PRACH occasion associated with a transmission information based on random access configuration information associated with the corresponding transmission information.

In the examples and embodiments below, it is assumed that the number of contention based preambles per SSB index per valid PRACH occasion associated with two respective transmission information are M and N, and the number of SSB indexes mapped to one valid PRACH occasion associated with two respective transmission information are P and Q. $N^{T,1}$ and $N^{T,2}$ represent the total number of preambles determined for a PRACH occasion based on random access configuration information associated with a first and second transmission information respectively, $N^{T}$ represents the total number of preambles determined for a PRACH occasion based on random access configuration information commonly configured regardless of transmission information.

In some embodiments, one SSB index is mapped to one or more valid PRACH occasions for any of the transmission information.

In a PRACH occasion, M contention based preambles with consecutive indexes staring from preamble index 0 are associated with the SSB per valid PRACH occasion associated with the first transmission information. In a PRACH occasion associated with a second transmission information, N contention based preambles with consecutive indexes staring from preamble index 0 are associated with the SSB per valid PRACH occasion associated with the second transmission information.

In a PRACH occasion, M contention based preambles with consecutive indexes staring from preamble index 0 are associated with the SSB per valid PRACH occasion associated with the first transmission information. In a PRACH occasion associated with a second transmission information, N contention based preambles with consecutive indexes staring from preamble index $N_{T,1}$ are associated with the SSB per valid PRACH occasion associated with the second transmission information.

In an embodiment, multiple SSB indexes is mapped to one valid PRACH occasion for any of the transmission information.

In a PRACH occasion, M contention based preambles with consecutive indexes staring from preamble index $n*N^{T,1}/P$ are associated with SSB index n per valid PRACH occasion associated with the first transmission information. In a PRACH occasion associated with a second transmission information, N contention based preambles with consecutive indexes staring from preamble index $m*N^{T,2}/Q$ are associated with SSB index m per valid PRACH occasion associated with the second transmission information.

Figure 13:
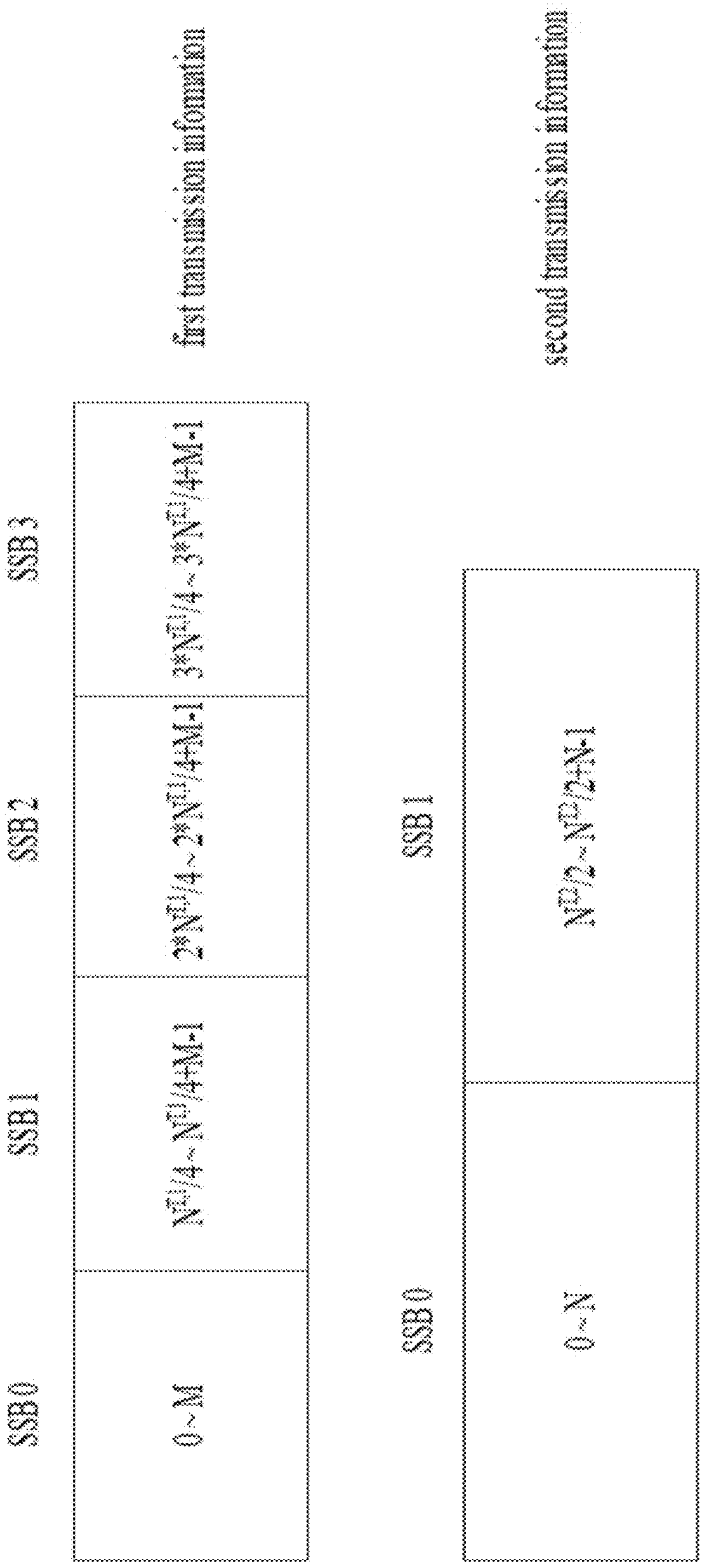
FIG. 13 shows an example of association of preamble indexes to SSB indexes per valid PRACH occasion.

FIG. 13 illustrates an example of association of preamble indexes to SSB indexes per valid PRACH occasion. As shown in in FIG. 13, 4 SSB indexes are mapped in one PRACH occasion associated with transmission information 1, 2 SSB indexes are mapped in one PRACH occasion associated with transmission information 2.

In a PRACH occasion, M contention based preambles with consecutive indexes staring from preamble index $n*(N^{T}-N^{T,2})/P$ are associated with SSB index n per valid PRACH occasion associated with the first transmission information. In a PRACH occasion associated with a second transmission information, N contention based preambles with consecutive indexes staring from preamble index $N^{T,1}+m*(N^{T}-N^{T,1})/Q$ are associated with SSB index m per valid PRACH occasion associated with the second transmission information.

In embodiments above, m and n are indexes of SSBs mapped in the same PRACH occasion, not the indexes determined based on the time domain position as stated in Embodiment 2, and $0 \le n \le P-1$, $0 \le m \le Q-1$.

In an embodiment, multiple SSB indexes is mapped to one valid PRACH occasion for a first transmission information and one SSB index is mapped to one valid PRACH occasion for a second transmission information.

In a PRACH occasion, M contention based preambles with consecutive indexes staring from preamble index $n*N/P^{T,1}$ are associated with SSB index n per valid PRACH occasion associated with the first transmission information. In a PRACH occasion associated with a second transmission information, N contention based preambles with consecutive indexes staring from preamble index 0 are associated with SSB index m per valid PRACH occasion associated with the second transmission information.

In a PRACH occasion, M contention based preambles with consecutive indexes staring from preamble index $n*(N^{T}-N^{T,2})/P$ are associated with SSB index n per valid PRACH occasion associated with the first transmission information. In a PRACH occasion associated with a second transmission information, N contention based preambles with consecutive indexes staring from preamble index $N^{T,1}$ are associated with the SSB index per valid PRACH occasion associated with the second transmission information.

In embodiments above, the last preamble index associated with a former SSB index and the start preamble index associated with the latter SSB index can be discontinuous as some preambles are configured not for contention based random access.

In some embodiments, when SSB indexes are associated with different transmission information are mapped to a same valid PRACH occasion and UE determines to transmit random access preambles associated with respective transmission information, wherein the determined random access preambles are associated with the SSB indexes mapped in the same PRACH occasion, UE determines a first preamble transmission in a first PRACH occasion and determines a second preamble transmission in a second PRACH occasion, and UE determines the second preamble transmission in a third PRACH occasion if the first and second PRACH occasions are overlapped. In an example, SSB index 0 associated with transmission information 0 and SSB index 1 associated with transmission information 1 are mapped to more than 1 PRACH occasions in the association period, UE determines a first preamble transmission associated with SSB 0 in the first of above PRACH occasion and a second preamble transmission associated with SSB 1 in the second of above PRACH occasion.

Embodiment 4

Embodiment 4 is to initiate random access procedure based on more than one random access resource pools. Each random access resource pool comprises at least one of a plurality of preambles, a set of PRACH occasions, or a group of SSB indexes.

In some embodiments, UE initiates random access procedure triggered by the event of initial access from RRC_IDLE state. UE determines the preamble transmission based on one of the multiple random access resource pools and the determination is based on a default rule, a message from base station or the measurement.

The default rule comprises at least one of the following: (1) the first received random access resource pool; (2) the latest received random access resource pool.

The message comprises at least the transmission information. In an example, UE determines the preamble transmission based on the random access resource pool which is not associated with a specific transmission information (e.g., additional PCI).

The measurement provides information to instruct UE to select a random access resource pool. In an example, the measurement indicates that the channel condition associated with a specific random access resource pool is the best or beyond a predefined/configured threshold.

In some embodiments, UE initiates random access procedure triggered by the event of RRC Connection Re-establishment procedure. UE determines the preamble transmission associated with a transmission information based the random access resource pool associated with the corresponding transmission information.

In some embodiments, UE initiates random access procedure triggered by the event of DL or UL data arrival during RRC_CONNECTED when UL synchronization status is "non-synchronized" (i.e., uplink time alignment timer expires).

UL synchronization status for each transmission information is separately determined based on uplink time alignment timer associated with respective transmission information. UE determines the preamble transmission associated with a transmission information based on the corresponding random access resource pool.

UL synchronization status for multiple transmission information is commonly determined based on a common uplink time alignment timer, i.e. UL synchronization status for multiple transmission information is "synchronized" or "non-synchronized" at a same time.

UE determines the preamble transmission based on one of the multiple random access resource pools and the determination is based on a default rule, a message from base station or the measurement familiar as stated for UE initiating random access procedure triggered by the event of initial access from RRC_IDLE state.

In some embodiments, UE initiates random access procedure triggered by one of the events of lacking resources, SR failure, RRC reconfiguration, request for Other SI or beam failure recovery. The events are associated with a transmission information. UE determines the preamble transmission associated with a transmission information based the random access resource pool associated with the corresponding transmission information.

In some embodiments, UE initiates random access procedure triggered by the event of establishing time alignment for a secondary TAG. The secondary TAG comprises at least one of a TAG not including a specific serving cell, a TAG which is not associated with a specific transmission information or a TAG which does not have a specific TAG index. In an example, the specific serving cell can be the primary serving cell, the specific transmission information can be CORESETPoolIndex with value 0, the specific TAG index can be 0. UE determines the preamble transmission based on the random access resource pool associated with the corresponding TAG.

Some preferred embodiments may use the following solutions.

Figure 14:
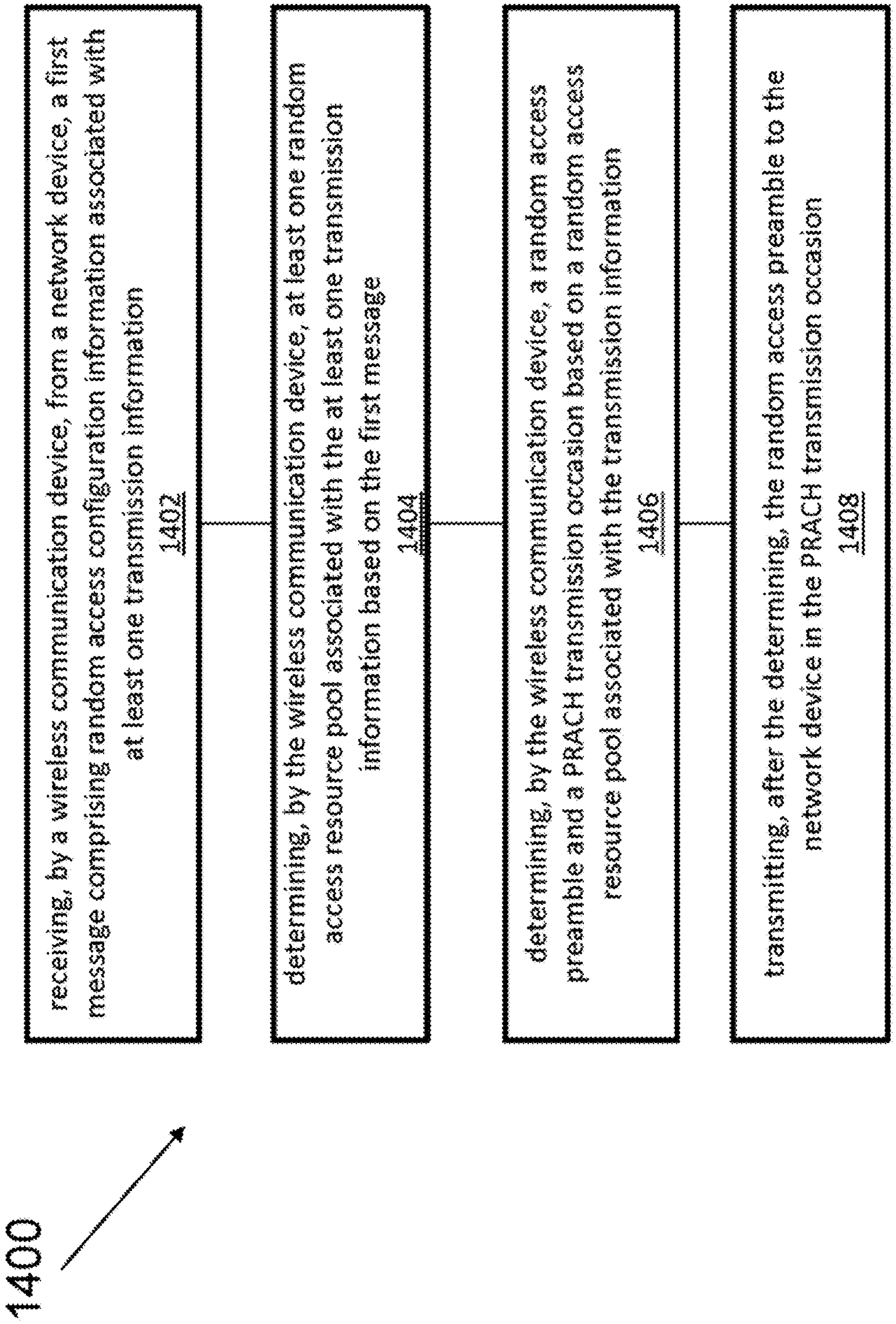
FIG. 14 is a flowchart illustrating an example method.

1. A method of wireless communication (e.g., method 1400 depicted in FIG. 14) including receiving, by a wireless communication device, from a network device, a first message comprising random access configuration information associated with at least one transmission information (1402); determining, by the wireless communication device, at least one random access resource pool associated with the at least one transmission information based on the first message (1404); determining, by the wireless communication device, a random access preamble and a PRACH transmission occasion based on a random access resource pool associated with the transmission information (1406); and transmitting, after the determining, the random access preamble to the network device in the PRACH transmission occasion (1408). Additional details and examples are discussed with respect to Embodiments 1 and 4.

2. The method of solution 1, the random access pool is determined based on an initially or most recently received random access configuration information.

3. The method of solution 1, the random access pool is determined based on a second message, wherein the second message comprises at least a transmission information.

4. The method of solution 1, the random access pool is determined based on wireless device measurement, wherein the measurement indicates a random access pool to be used.

5. The method of solution 1, wherein determining the one random access resource pool further comprising: determining at least one set of PRACH transmission occasions associated with respective transmission information.

6. The method of solution 1, further comprising: receiving, by the wireless communication device, from the network device, at least one set of SS/PBCH blocks associated with transmission information; and determining, by the wireless communication device, the index of SS/PBCH blocks of a set based on the time domain position of each SS/PBCH block.

7. The method of solution 1, wherein the wireless communication device determines the random access pool, further comprising: determining, by the wireless communication device, a mapping of SSB index to a PRACH transmission occasion based on a third message.

8. The method of solution 1, wherein the wireless communication device determines the random access pool, further comprising: determining, by the wireless communication device, an association between a SSB index and a random access preamble for a PRACH transmission occasion based on the first message.

9. The method of any of solutions 1-8, wherein the wireless communication device further generates at least one set of random access preambles for a PRACH transmission occasion based on the first message.

10. The method of solution 9, wherein each of the set of random access preambles corresponds to a respective transmission information based on the first message.

11. The method of solution 9, wherein the set of random access preambles corresponds to any transmission information.

12. The method of solution 1, further comprising: determining, a first random access preamble associated with a first transmission information to be transmitted in a first PRACH transmission occasion; determining, a second random access preamble associated with a second transmission information to be transmitted in a second PRACH transmission occasion; determining, a third PRACH transmission occasion when the first and second PRACH transmission occasion are overlapped in time/frequency domain; and transmitting, the first random access preamble in the first PRACH transmission occasion and the second random access preamble in the third PRACH transmission occasion.

Figure 15:
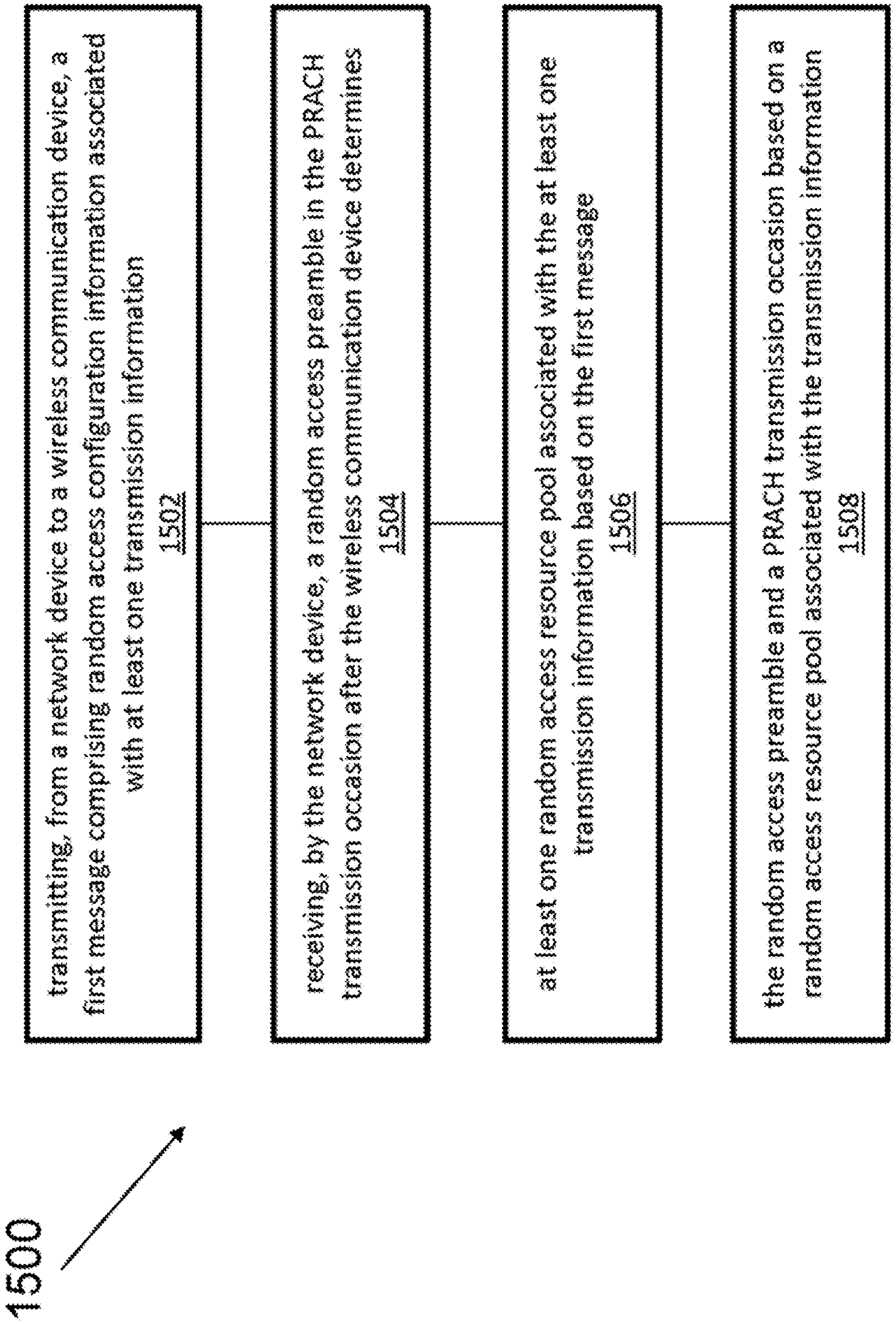
FIG. 15 is a flowchart illustrating an example method.

13. A method of wireless communication (e.g., method 1500 depicted in FIG. 15) comprising: transmitting, from a network device to a wireless communication device, a first message comprising random access configuration information associated with at least one transmission information (1502); receiving, by the network device, a random access preamble in the PRACH transmission occasion after the wireless communication device determines (1504): at least one random access resource pool associated with the at least one transmission information based on the first message (1506); and the random access preamble and a PRACH transmission occasion based on a random access resource pool associated with the transmission information (1508). Additional details and examples are discussed with respect to Embodiments 1 and 4.

14. The method of solution 13, the random access pool is determined based on an initially or most recently received random access configuration information.

15. The method of solution 13, the random access pool is determined based on a second message, wherein the second message comprises at least a transmission information.

16. The method of solution 13, the random access pool is determined based on wireless device measurement, wherein the measurement indicates a random access pool to be used.

17. The method of solution 13, wherein determining the one random access resource pool further comprising: determining at least one set of PRACH transmission occasions associated with respective transmission information.

18. The method of solution 13, further comprising: transmitting, from the network to the wireless communication device, at least one set of SS/PBCH blocks associated with transmission information; and wherein the wireless communication device determines the index of SS/PBCH blocks of a set based on the time domain position of each SS/PBCH block.

19. The method of solution 13, wherein the wireless communication device determines the random access pool, further comprising the wireless communication device determines a mapping of SSB index to a PRACH transmission occasion based on a third message.

20. The method of solution 13, wherein the wireless communication device determines the random access pool, further comprising the wireless communication device determines an association between a SSB index and a random access preamble for a PRACH transmission occasion based the first message.

21. The method of any of solutions 13-20, wherein the wireless communication device further generates at least one set of random access preambles for a PRACH transmission occasion based on the first message.

22. The method of solution 21, wherein each of the set of random access preambles corresponds to a respective transmission information based on the first message.

23. The method of solution 21, wherein the set of random access preambles corresponds to any transmission information.

24. The method of solution 13, further comprising: determining, a first random access preamble associated with a first transmission information to be transmitted in a first PRACH transmission occasion; determining, a second random access preamble associated with a second transmission information to be transmitted in a second PRACH transmission occasion; determining, a third PRACH transmission occasion when the first and second PRACH transmission occasion are overlapped in time/frequency domain; and receiving, the first random access preamble in the first PRACH transmission occasion and the second random access preamble in the third PRACH transmission occasion.

25. The method of any of the solutions 1 to 24, wherein the random access configuration information comprises at least one of following: a total number of random access preambles, a number of synchronization signal/physical broadcast channel block (SSB) per physical random access channel (PRACH) occasion, a number of preambles for contention based random access (CBRA) associated with a SSB index, a number of preambles for a specific group, a value range used in reference signal received power (RSRP) measurements and thresholds, a subcarrier spacing (SCS), an index of root sequence for determining preambles, an index of the PRACH configuration, a number of PRACH transmission occasions frequency division multiplexed (FDMed) in one time instance, or an indication to determine the frequency position of a PRACH occasion. Additional details and examples are discussed with respect to Embodiments 1 and 3.

26. The method of any of the solutions 1 to 24, wherein the PRACH transmission occasion comprises an area specified in time and frequency domain that are available for the transmission of a random access preamble.

27. The method of any of the solutions 1 to 24, wherein the random access resource pool further comprising at least one of the following: a plurality of preambles, a set of PRACH occasions, a group SSB indexes, a mapping of a SSB index to a PRACH occasion, or an association of between a SSB index and a random access preamble. Additional details and examples are discussed with respect to Embodiment 4.

28. The method of any of the solutions 1 to 24, wherein the transmission information comprises at least one of following: information grouping one or more reference signals, a reference signal resource set, a PUCCH resource set, panel related information, a sub-array, an antenna group, an antenna port group, a group of antenna ports, a beam group, a beam state, a candidate cell, a candidate cell group, a physical cell index (PCI), a time alignment group (TAG), TRP related information, a CORESET pool index, a set of power control parameters, an index of TCI state in a TCI state codepoint, a wireless communication device capability value, or a wireless communication device capability set.

29. The method of any of the solutions 1 to 24, wherein the third message further comprising at least one of the following: a flag, an index of the SSB, a number of SSBs, a bit map, a sequence of indices of SSBs, a period of the number of SSBs, a value within the period, time or frequency domain position related information of the SSB. Additional details and examples are discussed with respect to Embodiment 2.

30. A communication apparatus comprising a processor configured to implement a method recited in any one or more of solutions 1 to 29.

31. A computer readable medium having code stored thereon, the code, when executed, causing a processor to implement a method recited in any one or more of solutions 1 to 29.

The disclosed methods define some methods to initiate random access procedures associated with different transmission information. More specifically, defining separate random access configuration for multiple transmission information, and defining mapping of SSB index to PRACH occasion associated with a transmission information, and defining association of preamble index to SSB index per PRACH occasion associated with a transmission information, and defining the preamble transmission triggered by a specific event for a transmission information.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements, and variations can be made based on what is described and illustrated in this document.

What is claimed is:

1. A method of wireless communication comprising:

receiving, by a wireless communication device, from a network device, a message comprising a random access configuration information element associated with at least one transmission information, wherein the at least one transmission information includes a candidate cell, wherein the random access configuration information element includes information configuring: (1) a number of Synchronization Signal Blocks (SSBs) per Physical Random Access Channel (PRACH) occasion, (2) an index of a root sequence for determining a random access preamble, and (3) an indication of a frequency position of a PRACH occasion;

determining, by the wireless communication device based on the message, at least one random access resource pool associated with the at least one transmission information, wherein the at least one random access resource pool comprises a set of PRACH occasions;

determining, by the wireless communication device, the random access preamble and a PRACH transmission occasion based on the at least one random access resource pool; and transmitting, after determining the at least one random access resource pool and the random access preamble, the random access preamble to the network device in the PRACH transmission occasion.

2. The method of claim 1, further comprising:

generating multiple sets of random access preambles, wherein each of the multiple sets of random access preambles corresponds to a respective transmission information based on the message.

3. The method of claim 1, further comprising:

determining multiple PRACH occasions, wherein each of the multiple PRACH occasions corresponds to a respective transmission information based on the random access configuration information element.

4. The method of claim 3, wherein the multiple PRACH occasions are indexed according to a time position and a frequency position of the multiple PRACH occasions.

5. The method of claim 1, wherein the at least one transmission information comprises a physical cell index (PCI).

6. A method of wireless communication comprising:

transmitting, from a network device to a wireless communication device, a message comprising a random access configuration information element associated with at least one transmission information, wherein the at least one transmission information includes a candidate cell, wherein the random access configuration information element includes information configuring: (1) a number of Synchronization Signal Blocks (SSBs) per Physical Random Access Channel (PRACH) occasion, (2) an index of a root sequence for determining a random access preamble, and (3) an indication of a frequency position of a PRACH occasion; and receiving, by the network device, a random access preamble in a PRACH transmission occasion after the wireless communication device determines:

at least one random access resource pool associated with the at least one transmission information based on the message, wherein the at least one random access resource pool comprises a set of PRACH occasions; and the random access preamble and the PRACH transmission occasion based on the at least one random access resource pool associated with the at least one transmission information.

7. The method of claim 6, wherein multiple sets of random access preambles are generated by the wireless communication device, and wherein each of the multiple sets of random access preambles corresponds to a respective transmission information based on the message.

8. The method of claim 6, wherein each of multiple PRACH occasions corresponds to a respective transmission information based on the random access configuration information element.

9. The method of claim 8, wherein the multiple PRACH occasions are indexed according to a time position and a frequency position of the multiple PRACH occasions.

10. The method of claim 6, wherein the at least one transmission information comprises a physical cell index (PCI).

11. An apparatus for wireless communication comprising processor electronics and a memory storing instructions, execution of which by the processor electronics causes the apparatus to:

receive, from a network device, a message comprising a random access configuration information element associated with at least one transmission information, wherein the at least one transmission information includes a candidate cell, wherein the random access configuration information element includes information configuring: (1) a number of Synchronization Signal Blocks (SSBs) per Physical Random Access Channel (PRACH) occasion, (2) an index of a root sequence for determining a random access preamble, and (3) an indication of a frequency position of a PRACH occasion;

determine, based on the message, at least one random access resource pool associated with the at least one transmission information, wherein the at least one random access resource pool comprises a set of PRACH occasions;

determine the random access preamble and a PRACH transmission occasion based on the at least one random access resource pool; and transmit, after determining the at least one random access resource pool and the random access preamble, the random access preamble to the network device in the PRACH transmission occasion.

12. The apparatus of claim 11, further caused to:

generate multiple sets of random access preambles, wherein each of the multiple sets of random access preambles corresponds to a respective transmission information based on the message.

13. The apparatus of claim 11, further caused to:

determine multiple PRACH occasions, wherein each of the multiple PRACH occasions corresponds to a respective transmission information based on the random access configuration information element.

14. The apparatus of claim 13, wherein the multiple PRACH occasions are indexed according to a time position and a frequency position of the multiple PRACH occasions.

15. The apparatus of claim 11, wherein the at least one transmission information comprises a physical cell index (PCI).

16. An apparatus for wireless communication comprising processor electronics and a memory storing instructions, execution of which by the processor electronics causes the apparatus to:

transmit, to a wireless communication device, a message comprising a random access configuration information element associated with at least one transmission information, wherein the at least one transmission information includes a candidate cell, wherein the random access configuration information element includes information configuring: (1) a number of Synchronization Signal Blocks (SSBs) per Physical Random Access Channel (PRACH) occasion, (2) an index of a root sequence for determining a random access preamble, and (3) an indication of a frequency position of a PRACH occasion; and receive a random access preamble in a PRACH transmission occasion after the wireless communication device determines:

at least one random access resource pool associated with the at least one transmission information based on the message, wherein the at least one random access resource pool comprises a set of PRACH occasions; and the random access preamble and the PRACH transmission occasion based on the at least one random access resource pool associated with the at least one transmission information.

17. The apparatus of claim 16, wherein multiple sets of random access preambles are generated by the wireless communication device, and wherein each of the multiple sets of random access preambles corresponds to a respective transmission information based on the message.

18. The apparatus of claim 16, wherein each of multiple PRACH occasions corresponds to a respective transmission information based on the random access configuration information element.

19. The apparatus of claim 18, wherein the multiple PRACH occasions are indexed according to a time position and a frequency position of the multiple PRACH occasions.

20. The apparatus of claim 16, wherein the at least one transmission information comprises a physical cell index (PCI).

* * * * *